US011153437B2

United States Patent
Downing et al.

(10) Patent No.: US 11,153,437 B2
(45) Date of Patent: Oct. 19, 2021

(54) CALL FLOW MANAGEMENT

(71) Applicant: Ford Global Technologies, LLC, Dearborn, MI (US)

(72) Inventors: Mark Downing, Franklin, MI (US); Vivekanantha Thangavadivel, Windsor (CA); Shane Mock, Livonia, MI (US); Sasikumar Viswanathan, Farmington, MI (US); Krishna Chaitanya, Tamil Nadu (IN); Eric Hensel, Canton, MI (US); Ramesh Chalapaka, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 105 days.

(21) Appl. No.: 16/424,705

(22) Filed: May 29, 2019

(65) Prior Publication Data
US 2020/0382639 A1 Dec. 3, 2020

(51) Int. Cl.
*H04M 3/493* (2006.01)
*H04M 3/51* (2006.01)
*H04M 7/00* (2006.01)

(52) U.S. Cl.
CPC ....... *H04M 3/4931* (2013.01); *H04M 3/4936* (2013.01); *H04M 3/4938* (2013.01); *H04M 3/5166* (2013.01); *H04M 7/0075* (2013.01)

(58) Field of Classification Search
CPC ............. H04M 3/4931; H04M 3/5166; H04M 7/0075; H04M 3/4938; H04M 3/4936; H04M 2203/6081
See application file for complete search history.

(56) References Cited

U.S. PATENT DOCUMENTS

| | | | |
|---|---|---|---|
| 5,940,472 A | 8/1999 | Newman et al. | |
| 7,231,210 B1 | 6/2007 | Croak et al. | |
| 7,590,542 B2 | 9/2009 | Williams et al. | |
| 8,160,209 B2 | 4/2012 | Wang et al. | |
| 8,406,412 B2* | 3/2013 | Bethea | H04M 3/493 379/265.01 |
| 8,477,909 B2 | 7/2013 | Poi et al. | |
| 10,454,908 B1* | 10/2019 | Sumner | G06F 21/31 |
| 2007/0092073 A1* | 4/2007 | Olshansky | H04M 3/546 379/232 |
| 2007/0165808 A1* | 7/2007 | Pieraccini | H04M 3/51 379/142.04 |
| 2008/0304650 A1* | 12/2008 | Catlin | H04M 3/24 379/298 |
| 2013/0163746 A1* | 6/2013 | Wick | H04M 3/5166 379/265.14 |
| 2017/0085714 A1* | 3/2017 | Casasola | H04M 3/527 |
| 2017/0111506 A1* | 4/2017 | Strong | H04M 3/493 |
| 2019/0356778 A1* | 11/2019 | Ghai | H04M 3/5166 |
| 2020/0007680 A1* | 1/2020 | Wozniak | H04M 3/493 |
| 2020/0014642 A1* | 1/2020 | Sidi | H04L 51/04 |

* cited by examiner

*Primary Examiner* — Lisa Hashem
(74) *Attorney, Agent, or Firm* — Brandon Hicks; Bejin Bieneman PLC

(57) ABSTRACT

In a voice response unit (VRU) that is one of a plurality of VRU's, a call flow can be selected for an inbound voice call based on an identifier for the inbound voice call. A parameter can then be written to at least one directory server, the parameter specified to replace a default parameter for the selected call flow. The selected call flow can be invoked according to the parameter.

18 Claims, 2 Drawing Sheets

CALL FLOW MANAGEMENT

BACKGROUND

Interactive voice response (IVR) systems can include distributed components to manage call flows. IVR components can include complex and/or detailed programming to handle various scenarios.

DETAILED DESCRIPTION

Overview

Figure 1:
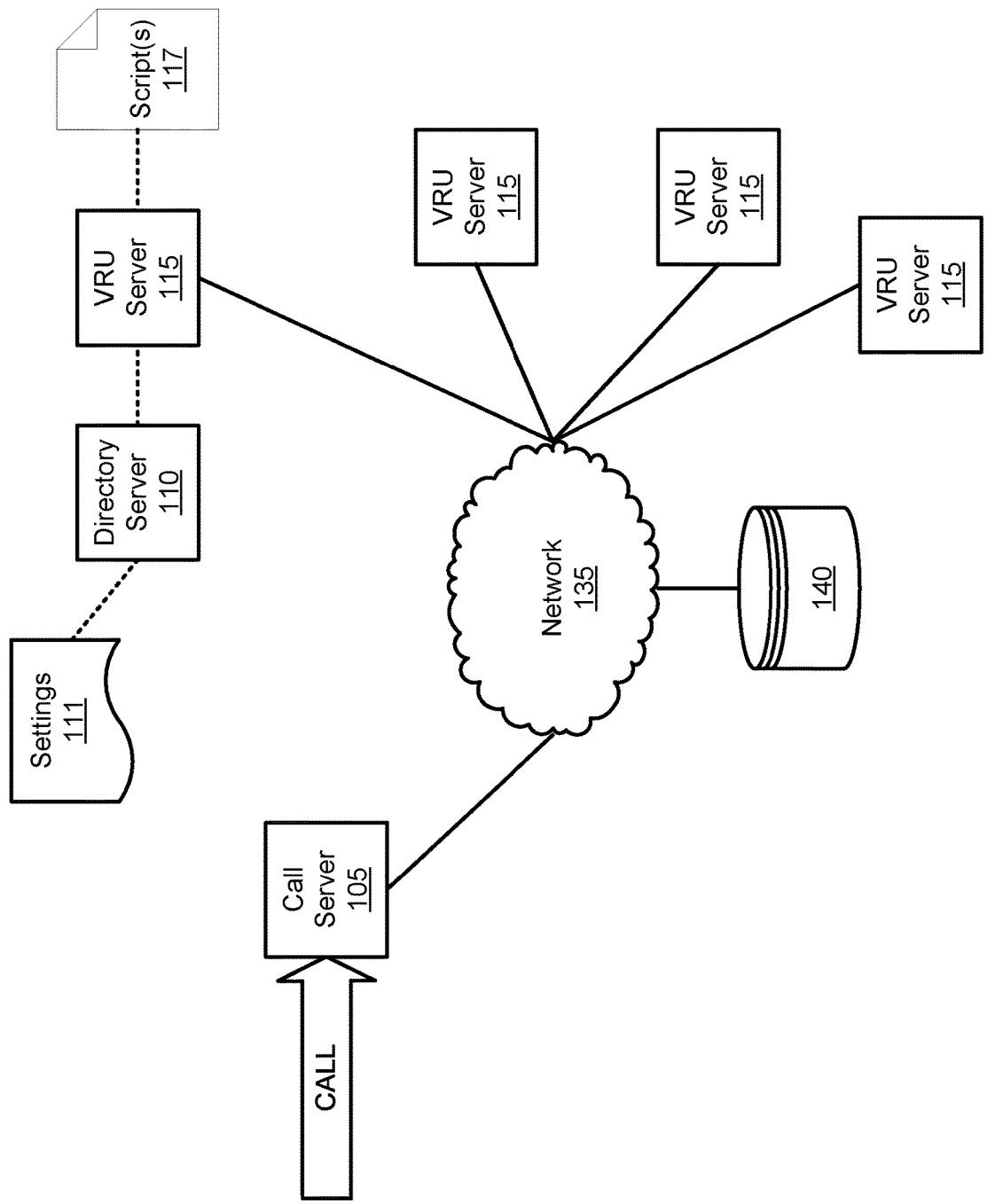
FIG. 1 is a block diagram of an example interactive voice response (IVR) call system.

A system comprises at least one directory server, and a plurality of interactive voice response units (VRUs). A first one of the VRUs is programmed to select a call flow for an inbound voice call based on an identifier for the inbound voice call; write to the at least one directory server a parameter specified to replace a default parameter for the selected call flow; and invoke the selected call flow according to the parameter. The first VRU can be further programmed to output a machine-readable prompt upon receiving the instruction to invoke the selected call flow, and to receive input of an identifier to validate that the call is specified for the selected call flow before writing the parameter to the at least one directory server. The at least one directory server may be one of a plurality of directory servers, wherein each of the directory servers is included in a respective one of the VRUs. The at least one directory server can include programming to provide the parameter in response to a request from at least one of the VRUs. A second one of the VRUs can be programmed to, upon receiving a request to execute at least part of the selected call flow, retrieve the parameter from the directory server; and then execute the call flow according to the parameter. The parameter can include at least one of a day of the week, a date, or a time. The parameter can include a database identifier. The parameter can include a debug flag. The parameter can be one of a plurality of parameters stored in the directory server for the selected call flow. The first VRU can be further programmed to obtain the parameter via at least one of user input or stored data.

A method comprises selecting, in a voice response unit (VRU) that is one of a plurality of VRU's, a call flow for an inbound voice call based on an identifier for the inbound voice call; writing to at least one directory server a parameter specified to replace a default parameter for the selected call flow; and invoking the selected call flow according to the parameter. The method can further comprise outputting a machine-readable prompt upon receiving the instruction to invoke the selected call flow, and receiving input of an identifier to validate that the call is specified for the selected call flow before writing the parameter to the at least one directory server. The at least one directory server can be one of a plurality of directory servers, wherein each of the directory servers is included in a respective one of the VRUs. The method can further comprise providing, in the at least one directory server, the parameter in response to a request from at least one of the VRUs. The method can further comprise retrieving, in a second one of the VRUs, upon receiving a request to execute at least part of the selected call flow, the parameter from the directory server; and then executing the call flow according to the parameter. The parameter can include at least one of a day of the week, a date, or a time. The parameter can include a database identifier. The parameter can include a debug flag. The parameter can be one of a plurality of parameters stored in the directory server for the selected call flow. The method can include the first VRU obtaining the parameter via at least one of user input or stored data.

Exemplary System

FIG. 1 is a block diagram of an example interactive voice response (IVR) call system 100 that receives and handles incoming voice telephony calls. Calls are typically received in a call server 105 that can receive calls from one or more gateways. As seen in FIG. 1, the call server 105 can communicate via a network 135 with other devices including a directory server 110 and a voice response unit (VRU) server 115. The call server 105 can be programmed to determine one or more attributes or characteristics of an incoming call, such as an originating telephone number of the call according to automatic number identification (ANI). The call server 105 can then direct the call to a VRU server 115 which will then execute one or more IVR scripts 117 to determine a call flow, i.e., a set of one or more steps, each of which may be selected in response to data input by a user, data retrieved from a database, and/or system values such as a date, a time of day, etc.

Advantageously, when one or more attributes of an incoming call matches a predetermined attribute, e.g., an originating telephone number matches a stored telephone number, the call server 105 can forward the call to a VRU 115 execute programming to handle the call flow according to one or more specified parameters that would not be used absent the incoming call matching the predetermined attribute. A VRU 115 can include programming, e.g., in a script 117, to modify parameters of the system 100 to vary from default or real-world parameters. For example, a script 117 can specify to handle a call for a specific date or time regardless of a real-world date or time. In another example, a script 117 could specify to handle a call by accessing a customized database 140, rather than a default database 140, where the customized database 140 provides specified data for handling the call that could vary from real-time or real-world data. For example, a call flow could include retrieving data associated with an input identifier, e.g., a customer or product identifier, whereupon a custom database 140 could provide data to test the call flow. A script 117 could also activate a debug flag or the like. In all of these examples, a script 117 includes instructions to write or store call flow parameters as settings 111 in a directory server 110. Advantageously, the settings 111 can be provided to, and then retrieved by, any of the plurality of VRU servers 115 that could handle at least part of the call flow. Thus, advantageously, various scenarios for a call flow, even if pertaining to special dates such as holidays, can be tested at any time. Even further advantageously, because each call includes settings 111 substantially uniquely associated with an identifier for the call, various different scenarios can be tested in different calls taking place at a same time.

The call server 105 can include hardware and/or software to receive incoming calls from one or more gateways, e.g., a call can originate via the public switched telephone network (PSTN), as a Voice over Internet Protocol (VoIP) call, etc., according to conventional technologies such as Session Initiation Protocol (SIP) for establishing calls. Further, the call server 105 can include conventional hardware and software for routing or forwarding calls. For example, the server 105 can include programming to execute ANI for an incoming call, and to provide the call to a VRU server 115 along with an originating telephone number detected by ANI. FIG. 1 shows a single call server 105 for ease of illustration, but it should be understood that the system 100 could include a plurality of call servers 105 to receive respective incoming calls and to forward the calls to VRU servers 115.

As further illustrated in FIG. 1, the system 100 includes a plurality of VRU servers 115. Each VRU server 115 includes hardware including a processor and a memory, the memory typically storing instructions executable by the processor. Each VRU server 115 typically stores a plurality of scripts 117 (again, each of the scripts 17 is typically replicated and stored in a memory of each respective VRU server 115 in the system 100). In one example, some scripts 117 provide instructions according to the Unified Intelligent Contact Management (ICM) platform provided by Cisco Systems, Inc., of San Jose, Calif., i.e., some scripts 117 are ICM scripts. Further in this example, some scripts 117 provide instructions according to Cisco's Unified Customer Voice Portal (CVP) which provides various functionality, including use of VoiceXML to provide callers with requested and retrieved information, e.g., from a database 140.

The call server (also referred to as a call router) 105 can include programming, e.g., according to load-balancing and/or other techniques such as may be known, to select a specific VRU server 115 to which a call is forwarded. Accordingly, it is typically not possible to determine in advance a specific VRU server 115 that will receive a particular call. Advantageously, however, because each VRU server 115 can obtain custom parameters from settings 111 in a directory server 110, the system 100 is nonetheless able to ensure that custom parameters indicated for a call identifier can be implemented for any part of a call flow regardless of which VRU server 115 is allocated by the call server 105 to execute that portion of the call flow. That is, respective directory servers 110 and settings 111 stored therein, along with respective scripts 117, are all typically replicated on each VRU server 115, although for ease of illustration FIG. 1 shows only one VRU server 115 including a directory server 110, settings 111, and scripts 117.

In one example, a script 117 that is invoked when a VRU server 115 receives an incoming call from the call server 105, upon execution can determine a specific set of settings 111 for an originating telephone number for a call. The script 117 can then call or execute programming to store the settings 111 in respective directory servers 110 of VRU's 115 included in the system 100. For example, in an implementation, a script 117 causes execution of programming included in a JAR (Java ARchive) file to store the settings 111 in respective directory servers 110 of VRU's 115 included in the system 100. Likewise, programming included in a JAR file can be called from a script 117 and used to retrieve settings 111.

A directory server 110 in one example is a hypertext transfer protocol (HTTP) server, i.e., conventional programming that can be included in a memory of a VRU server 115 to provide responses to HTTP requests. The directory server 110 can store and/or access settings 111, e.g., in a file, data structure, database, etc., in a memory of a VRU server 115. In an example implementation, settings 111 are provided in a file formatted according to an extensible markup language (XML) schema.

Settings 111 include respective data values that can govern or determine a call flow, as follows. In the present context, a "call flow" is a sequence of inputs and responses during a call as the call is handled by VRU servers 115. The call flow is typically governed by instructions or commands included in IVR scripts 117, where the instructions or commands can include evaluating settings 111. Hence, a "parameter," as that term is used herein, means a category of data, having a range of possible data values, that can be provided as input to determine a next step or operation in a call flow, and a "setting" is a specific data value stored in setting 111 in a directory server 110.

Example parameters stored in settings 111 can include a date, a time, a range of dates, a range of times, a day of week, a specific holiday (e.g., New Year's Day, Labor Day, etc.), a database 140 identifier, one or more debug flags, etc. Other example parameters include flags to override or change default programming of a VRU server 115. For example, a call type override parameter can override a call type value otherwise set by the VRU server 115 to specify a test call, which can be important so that the VRU does not include the call on a log or report of non-test calls. Similarly for example, a queue can override programming otherwise executed by the VRU server 115 to include a call in a report of queued calls at a particular time, which is useful to avoid reporting test calls as calls in a queue, for example. Yet further, parameters can be specified to accommodate testing a call flow in a second language, or to simulate a call agent. Yet further, although the call server 105 typically determines a specific VRU 115 to execute a call flow (or portion thereof), a parameter could specify a VRU 115 (e.g., by IP address or some other identifier) for executing the call flow or portion thereof, which is useful for debugging or determining whether there is an issue with a specific VRU 115.

The network 135 is typically a wired network but can include wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks can include Ethernet, wireless communications (e.g., using Bluetooth®, Bluetooth® Low Energy (BLE), IEEE 802.11, local area networks (LAN) and/or wide area networks (WAN), including the Internet, and the like.

The database 140 can be a relational database, a file, e.g., including alphanumeric strings delimited by a space, a tab, a comma, etc.

Process

Figure 2:
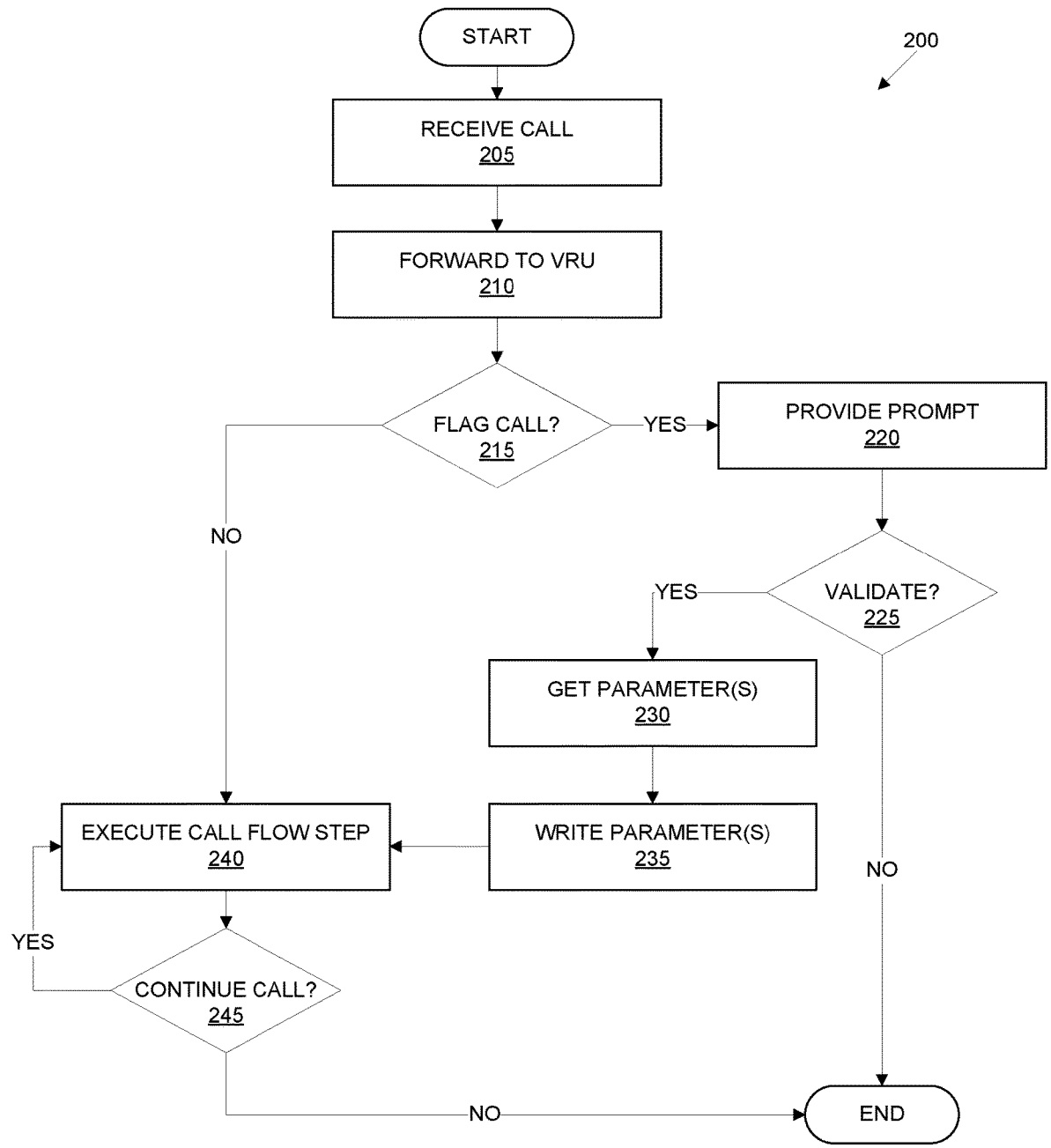
FIG. 2 is a flowchart of an exemplary process for providing a call flow in response to an incoming call.

FIG. 2 is a flowchart of an exemplary process 200 for providing a call flow in response to an incoming call. Steps of the process 200 may be executed according to program instructions stored in computing devices described herein, e.g., the call server 105 and VRU 115. For example, the VRU 115 could include ICM and/or CVP scripts such as mentioned above, as well as programming in Java or the like to execute certain steps. Further, the VRU 115 could include the directory server 110, which could execute programming to store and/or provide information, e.g., to store call parameter values as settings 111, in XML format, and to provide settings 111 in response to requests, e.g., HTTP requests.

The process 200 begins in a block 205, in which the call server 105 receives an incoming call and detects a call identifying attribute or attributes, typically an originating telephone number by using ANI.

Next, in a block 210, the call server 105 forwards the call to a VRU 115 along with the identifying information, e.g., an originating telephone number. As mentioned above, the specific VRU 115 to which the call is forwarded may be selected by the call server 105 according to a conventional load-balancing or call distribution scheme, and typically the specific VRU 115 to which the call is forwarded cannot be predicted ahead of time.

Next, in the block 215, the VRU 115 to which the call is forwarded determines whether to flag the call to be processed according to one or more custom parameters. For example, as explained above, a call could be identified according to ANI, where an originating telephone number identified by ANI was stored in a memory of the VRU 115 as an identifier for a call to be provided with one or more parameters for a call flow. In one example, the VRU 115 executes an IVR script 117, e.g., an ICM script or the like, such as mentioned above, to determine whether a call identifier is detected to be flagged for custom or specified parameters. If the call is flagged, then a block 220 is executed next. Otherwise, the process 200 proceeds to a block 240.

In the block 220, the VRU 115, e.g., according to an IVR script 117 provides a prompt such as a dual-tone multi-frequency (DTMF) prompt for a user to provide an identifier confirming that a call is intended for a custom call flow. This step is not absolutely necessary, but can be useful for ensuring that only intended users, e.g., testers, are able to access custom call flows, as opposed to other users, e.g., customers, of a call center. For example, the VRU 115 could store a numeric code to be received after the prompt is provided.

Next, in a block 225, the VRU 115 determines whether input was provided in response to the prompt to validate the call for a custom call flow. If input was not received, e.g., if a numeric code matching a stored numeric code was not received within a specified time, then the VRU 115 could determine that the call is not validated, whereupon the process 200 could end. Otherwise, the process 200 can proceed to a block 230.

In the block 230, the VRU 115 obtains one or more custom call flow parameters. In one example, the VRU 115 uses conventional IVR techniques, i.e., playing a request to enter data, and then using automatic speech recognition (ASR) and/or DTMF responses to obtain parameters such as a date, a time, a day of week, a range of dates and/or times, etc. Alternatively or additionally, parameters could be obtained from a file, e.g., an XML file, stored on the VRU 115, and associated with the substantially unique call identifier.

Next, in a block 235, the VRU 115 writes the parameters obtained in the block 230 to settings 111, e.g., an XML file or the like, in the directory server 110 along with a substantially unique identifier for the call, e.g., a globally unique identifier (GUID) or the like that can be provided by the call server 105 one forwarding the call. As mentioned above, a directory server 110 can be provided on each respective VRU 115 in the system 100. Accordingly, in the block 235, the VRU 115 that received the call as described above with respect to the block 210 can write the settings 111, along with the substantially unique identifier, to each of the respective directory servers 110 for each of the VRU's 115. For example, the VRU 115 could include a JAR file that could be called from a CVP script 117 to write the settings 111 to respective directory servers 110. Advantageously, once the settings 111 have been provided to respective directory servers 110 on each respective VRU 115 in association with the substantially unique call identifier, then any of the VRU's 115 assigned to handle part of a call flow will handle the call flow according to the specified parameters stored in the settings 111.

In a block 240, which can follow either of the blocks 215 or 235, the VRU 115 executes a call flow step for the call received in the block 205. That is, the VRU 115 executes an IVR script 117 to provide output (typically recorded or synthesized voice output) and/or request user input (typically voice input and/or DTMF input). For example, the IVR script 117 can be a CVP script called from an ICM script or another CVP script. The IVR output can be conventional output, such as a request for a username, a request for an identifier such as a Social Security number, customer number, etc., a request to identify a subject of a query (e.g., new order, existing order, technical support, etc.), or other IVR output. Likewise, the IVR input can include responses to such output.

As part of executing a call flow step in the block 240, the IVR script 117 that is executed includes an instruction or instructions to query the directory server 110 for the substantially unique call identifier, and to retrieve and use in executing the call flow step any parameters stored in the settings 111. For example, settings 111 could include a test flag or the like that is set to "yes" or "on," etc., when a substantially unique call identifier is recognized as having custom or specified parameters. On determining that the test flag is set to affirmative the VRU 115 could then retrieve one or more settings 111.

For example, a setting 11 could specify a specific date, other than an actual current date, as a current date. The IVR script 117 could then include an instruction to proceed with the call with a current date variable set to the parameter retrieved from settings 105 rather than a default or system current date. Settings 111 could alternatively or additionally specify parameters for use instead of default or system parameters such as day of week, time of day, etc. In another example, a parameter could specify a database 140, such that when the call flow includes a database query, the IVR script 117 proceeds to query the specified database 140, e.g., a test database, rather than a standard or default database, e.g., a production database 140. Further, the IVR script 117 typically includes an instruction to set one or more debug flags to "on," "yes," "1," etc., thus enabling a debugger to log various output.

After execution of the call flow step is completed in the block 240, it is determined in a block 245 whether the call continues to a next call flow step. For example, a call could be terminated, e.g., by a user at the originating number hanging up. More commonly, a script 117 may determine a condition for terminating a call, e.g., a timeout of a request for input, entry of data meeting a specified condition, etc. However, if a call is to continue, the call may be returned to the call server 105, which will execute its load-balancing process or the like to transfer the call to a second one of the VRU's 115 in the system 100. The VRU 115 receiving the call in this step is referred to the second VRU 115 but may or may not be the same VRU 115 as the first VRU 115 that handled the call up to the first iteration of the block 240. However, even if the first and second VRU's 115 are the same, the process 200 returns to the block 240, the call having been transferred to the second VRU 115 along with the substantially unique call identifier, and the call is handled as with second VRU 115 relying on no prior or store data about the call. That is, the second VRU 115 first checks settings 111, e.g., in its local directory server 110, implements one or more parameters retrieved from the settings 111, if any, and then executes the next IVR step in the call flow.

If the call is not continued after the block 245, then the process 200 ends.

Conclusion

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on." If, herein, a first thing is described and/or claimed as being "based on" the second thing, then the first thing is derived or calculated from the second thing, and/or output from an algorithm, process, or program function that accepts some or all of the second thing as input and outputs some or all of the first thing.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

When a device, e.g., a computer, router, etc., includes a processor and a memory, and is further described as "programmed" to perform some function or operation, this means that the device stores instructions in its memory, that can and/or are retrieved and executed by the processor.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
    at least one directory server, and
    a plurality of interactive voice response units (VRUs), each VRU including a respective one of a plurality of directory servers; wherein a first one of the VRUs is programmed to:
        select, from a plurality of call flows, wherein each of the call flows includes a set of one or more steps and each of the call flows is selectable prior to identification of a user, a call flow for an inbound voice call based on an identifier of an origin for the inbound voice call;
        write to each of the directory servers in the respective VRUs a parameter specified to replace a default parameter for the selected call flow; and
        invoke the selected call flow according to the parameter.

2. The system of claim 1, wherein the first VRU is further programmed to output a prompt upon receiving the instruction to invoke the selected call flow, and to receive input of an identifier to validate that the call is specified for the selected call flow before writing the parameter to the at least one directory server.

3. The system of claim 1, wherein the respective directory servers include programming to provide the parameter in response to a request from at least one of the VRUs.

4. The system of claim 1, wherein a second one of the VRUs is programmed to:
    upon receiving a request to execute at least part of the selected call flow, retrieve the parameter from one of the directory servers; and
    then execute the call flow according to the parameter.

5. The system of claim 1, wherein the parameter includes at least one of a day of the week, a date, or a time.

6. The system of claim 1, wherein the parameter includes a database identifier that identifies a database.

7. The system of claim 1, wherein the parameter includes a debug flag.

8. The system of claim 1, wherein the parameter is one of a plurality of parameters stored in the directory servers for the selected call flow.

9. The system of claim 1, wherein the first VRU is programmed to obtain the parameter via at least one of user input or stored data.

10. A method, comprising:
    selecting, in a first voice response unit (VRU) that is one of a plurality of VRUs, each VRU including a respective one of a plurality of directory servers, from a plurality of call flows, wherein each of the call flows includes a set of one or more steps and each of the call flows is selectable prior to identification of a user, a call flow for an inbound voice call based on an identifier of an origin for the inbound voice call;
    writing from the first VRU to each of the directory servers in the respective VRUs a parameter specified to replace a default parameter for the selected call flow; and
    invoking from the first VRU the selected call flow according to the parameter.

11. The method of claim 10, further comprising outputting a prompt upon receiving the instruction to invoke the selected call flow, and receiving input of an identifier to validate that the call is specified for the selected call flow before writing the parameter to the at least one directory server.

12. The method of claim 10, further comprising providing, in one of the directory servers, the parameter in response to a request from at least one of the VRUs.

13. The method of claim 10, further comprising retrieving, in a second one of the VRUs, upon receiving a request to execute at least part of the selected call flow, the parameter from one of the directory servers; and then executing the call flow according to the parameter.

14. The method of claim 10, wherein the parameter includes at least one of a day of the week, a date, or a time.

15. The method of claim 10, wherein the parameter includes a database identifier.

16. The method of claim 10, wherein the parameter includes a debug flag.

17. The method of claim 10, wherein the parameter is one of a plurality of parameters stored in the directory servers for the selected call flow.

18. The method of claim 10, wherein the first VRU obtains the parameter via at least one of user input or stored data.

* * * * *